Patented Feb. 5, 1924.

1,482,740

UNITED STATES PATENT OFFICE.

CARLETON ELLIS, OF MONTCLAIR, NEW JERSEY.

CATALYZER AND PROCESS OF MAKING SAME.

No Drawing. Application filed May 27, 1918. Serial No. 236,669.

*To all whom it may concern:*

Be it known that I, CARLETON ELLIS, a citizen of the United States, and a resident of Montclair, in the county of Essex and State of New Jersey, have invented certain new and useful Improvements in Catalyzers and Processes of Making Same, of which the following is a specification.

This invention relates to a process of making a catalyzer which contains in many cases, sulphates or similar bodies commonly regarded as detrimental to catalytic action through having a poisoning action on the catalytic substances involved and the present invention also embraces the product of such process namely a catalyzer containing sulphur in the form of sulphates or analogous bodies such as phosphates and the like. The invention also embraces the use of the said catalyzers in hydrogenating oil.

In the production of a catalyzer by what is commonly termed "dry reduction" that is where the catalyzer is formed from nickel oxide or similar material by heating to 300-500° C. and passing hydrogen gas thereover, any sulphates, phosphates and the like which are present are, under some circumstances, reduced to a greater or less extent forming sulphur or sulphur compounds, phosphorus or phosphorus compounds, etc., which act as catalyzer poisons. Hence in the production of catalytic material it is customary to remove all sulphates or other impurities in order to avoid poisoning action. In the present invention sulphates may be added in substantial quantity or preferably are formed as a part of the reaction yielding the catalytic material.

The present application contains matter derived from Serial No. 808,461, filed December 23, 1913 (renewal February 13, 1919, No. 276,869), more particularly as regards the production of a catalyzer containing soluble or insoluble sulphates and to the production of catalytic material containing nickel which has been reduced from an oxygen-containing compound in the presence of sulphates substantially without the production of free sulphur, or of sulfur compounds which can act as catalyzer poisons.

For example a catalyzer suitable for hardening oils for technical purposes may be made by mixing equivalent amounts of barium hydrate and nickel sulphate yielding nickel hydrate or hydrated nickel oxide coprecipitated with barium sulphate. This may be reduced to give metallic nickel or catalytic material obtained by reduction of the nickel hydrate and barium sulphate mixture and may then be used for hardening of oils. In a similar manner a mixture of nickel carbonate and sodium sulphate may be reduced using care to avoid the production of sulphur (or of deleterious sulfur compounds such as sulfids,) during the reducing stage. It is commonly supposed that sulphur or sulphur compounds in its or their various forms (i. e., all sulfur compounds) if present in any substantial amounts act as poisons for catalyzers but I have observed when using sulphates, if care is taken in the reduction, the effect if anything is the contrary, that is, the presence of the sulphur in the form of sulphates is beneficial rather than otherwise and hence in the present invention I may make use of catalyzers of the nickel type in conjunction with sulphates, formerly regarded as catalyzer poisons. Thus nickel oxide may be prepared along with a water-soluble salt and this greatly facilitates the recovery of the spent nickel because the water soluble salts may be washed out and the nickel readily collected and used again. Another feature of a catalyzer of this type is that it may be used repeatedly. For example after having treated a charge of oil with 1 or 2% of the catalyzer, the latter may be removed by filterpressing and the catalyzer, more or less protected from the air by its envelope of oil, may be returned to the hydrogenating tank without any substantial loss in quantity and it may be used over and over again in this manner a number of times before the catalyzer becomes spent, when the nickel may be recovered as indicated. It has of course been supposed that the continued use in hydrogenation of a catalyzer containing sulphur compounds would bring about rapid deterioration, due to the formation of nickel sulphide. At ordinary hardening temperatures however, of say 160-180° C. this action if present is but very slightly apparent and in fact is much less noticeable than the poisoning action brought about by impurities in many of the oils which are hardened. The present invention therefore also contemplates a product consisting of nickel or similar catalytic material incorporated with a soluble or insoluble sulphate preferably present in substantial amount, the mixture being sealed in oil such as ordinary unhydrogenated animal or vegetable oil or preferably a hydrogenated product. In the latter case when this material is collected in a filter press the latter may be allowed to cool or be chilled, if desired, so that the cake is readily removed from the filter cloths as a firm solid material which may be easily handled.

When nickel carbonyl is used as a source of catalytic material it may be incorporated with a small quantity of oil in the presence of sodium sulphate and heated to 200° or higher in order to precipitate the nickel in contact with the sulphate.

The presence of dehydrating substances of the nature of anhydrous sodium sulphate or calcium sulphate is useful in freeing the oil of water, or reducing the content thereof.

One manner of carrying out a form of the present invention is to admix a concentrated solution of nickel nitrate with an equivalent amount (or excess) of quicklime or hydrated lime so as to form a compound of nickel hydrate and calcium nitrate or more precisely, perhaps, a basic compound of nickel and calcium nitrate, and calcining this material (e. g. in a rotary kiln), affording nickel oxide probably more or less in combination with calcium compounds. The material is then carefully reduced with hydrogen and is ready for use. During the operation of hydrogenating the oil, the active calcium compound (perhaps CaO) serves to satisfy the nascent fatty acid liberated, and thus the nickel is protected. Other protecting agents such as the oxides, hydrates, carbonates, etc., of calcium and magnesium likewise may be used.

Further in reference to the method of making catalyzer for the purposes aforesaid, it should be stated that nickel sulphate may be used instead of nickel nitrate mentioned above. If nickel sulphate is mixed with slaked lime, nickel hydrate and calcium sulphate are produced. This mixture may be dried and ignited in hydrogen. Or, prior to drying a small quantity of palladium chloride or other palladium salt may be added so as to secure the joint action of both nickel and palladium. The dried material is ignited in a current of hydrogen or other suitable reducing gas when it is ready for use as a catalyzer. One to two pounds of calcium oxide may be used to 10 pounds of fully hydrated nickel sulphate, to this mixture one ounce of a palladium salt being added if desired.

Similarly, other nickel salts such as nickel fluosilicate may be mixed with lime or other base to effect the required metathesis.

Carriers such as fuller's earth, kieselguhr and pumice of a more or less porous nature but usually considered as inert from the catalytic standpoint may be impregnated or surface-coated with the catalytic material. Or a metal catalyzer may be combined with active material such as charcoal of a porous character and the latter may be either impregnated or surface coated. Another type is a non-porous support of an inert material coated with an active material, while a non-porous body such as graphite may likewise be coated and exert some co-operative effect of action. Sulphates may be present with such carriers. Still another type of catalyzer is one in which an active material is coated on a water-soluble salt or simply mixed with it enabling the spent catalytic material to be recovered by boiling with water to remove the water soluble salt after the mixture has been more or less separated from the oil. One may prepare such a mixture from, for example, a nickel salt by taking a nickel sulphate as a saturated solution and mixing it with a solution of sodium carbonate or caustic soda forming grains of sodium sulphate, mingled with precipitated nickel hydrate or carbonate. This mass may be dried or it may be first filtered to remove excess of soluble salts and it then may be ground and reduced in hydrogen at a temperature below the point where sulfides readily form, in any substantial amount. Very minute traces of sulfides do not appreciably diminish the activity of nickel catalyzers.

Sulphur in certain forms has a poisoning action on nickel and care should be taken not to permit the sulphur to take this form and thus destroy the efficiency of the catalyzer. Similarly sodium phosphate or other soluble phosphates, which are not reduced by hydrogen at working temperatures, may be employed, or other salts which serve in a similar manner and do not of themselves or after reduction by hydrogen exert a toxic action on the catalyzer. To recover such a catalyzer after its activity is spent by boiling in water, the soluble salts dissolve, the oil comes to the surface and the nickel settles to the bottom.

Another form of catalytic material is the metal without any supporting body such as metallic nickel in an impalpable state and this may be prepared from nickel sulphate by heating with sodium hyophosphite solution and stirring vigorously to get the nickel in a finely-divided condition, containing some sulfate.

The precipitate obtained reduces oils readily by hydrogen transfer. By suitably proportioning these concentrates in preparing the catalyzer, a precipitate that is satisfactorily finely-divided is readily obtained.

A specific example of a composition made from nickel sulphate is the following: Approximately equivalent proportions of nickel sulphate and sodium carbonate are placed in solution separately and mixed, the reaction product is evaporated to dryness and then preferably ground to fine powder if in a lumpy condition. The powder is placed in cottonseed oil, preferably hydrogenated cottonseed oil, of a melting point of about 60° C. and is heated up to preferably over 200°, a temperature between 240° and 270° C. being suited. The hydrogen gas and in some cases carbon monoxide or mixtures of these gases may then be passed into the oil which is preferably agitated and reduction is allowed to progress until a sufficient quantity of metallic nickel or other form of nickel catalyzer is present to bring about oil-hardening in a rapid manner, when the mass is filtered and the concentrate of catalyzer is collected, placed in a fresh quantity of oil which is thereupon duly hardened by treatment with hydrogen. In place of using an oil and reducing vehicle, wax or glycerin or other body of a suitable character may be employed. As mineral oil and paraffin wax may contain sulphur compounds in a toxic form these should be examined before use.

Nickel sulphate and sodium carbonate or bicarbonate may be mixed in the dry state as powders and then moistened with water to bring about reaction, placed in oil and heated, moisture being expelled with some foaming and the temperature being raised to 250° C. or upwards while a current of hydrogen is passed through the stirred mass.

The invention, in another form, contemplates the use of an organic compound of nickel, as the material from which catalytic bodies are produced. Thus nickel formate, acetate, oleate and the like may be used. Similarly cobalt or a compound of cobalt may be used in place of nickel or admixed therewith. The platinum group of metals may be employed in some cases. The invention will be illustratively described employing nickel formate as a typical organic salt. This salt is used as illustrative of many salts comprising a metal united to an organic radical, which may be used. Formic acid is the simplest of the aliphatic carboxylic acid. Nickel formate is especially useful since it is readily decomposed on heating to about 240° C. producing metallic nickel or catalytic nickel material which is well-adapted for the hardening of oils by the hydrogenation process. The procedure of the present invention may therefore take the following form: Calcium formate is first prepared and a solution of this salt is mixed with a solution of nickel sulphate using equivalent proportions to yield nickel formate and calcium sulphate. Such portion of the latter as separates may be filtered off if desired but preferably the solution containing all the calcium sulphate is evaporated to dryness and ground to a fine powder. It is then mixed with an oil such as cottonseed oil or Russian petroleum oil and heated to about 240° C. preferably with stirring. The mass blackens, yielding catalytic material. After about one hour's treatment at this temperature the catalyzer may be filtered from the oil and used to harden any oil which it is desired to treat, such as cottonseed, corn, peanut, tallow, linseed, whale and other animal or vegetable oils. By carrying out the reduction of the formate below 250° C. substantially no reduction of the sulphates occurs to produce compounds inimical to the activity of the catalyzer so that the latter may be used several times to harden the oils in question. As a temperature of between 150 and 200° C. is preferably used in the hardening operation, no substantial amount of the sulphates are reduced under these conditions and therefore the presence in the catalyzer of sulphur compounds does not interfere with the hydrogenating step.

The calcium formate may be prepared by treating slaked lime with diluted formic acid. The nickel sulphate may be prepared by the solution of natural nickel oxide such as the Canadian green nickel oxide in sulphuric acid, or by fusing the oxide with acid sodium sulphate (nitre cake). Other compounds of formic acid such as the barium salt may likewise be employed.

The mixture of nickel formate and calcium sulphate resulting from the reaction may be treated by either the wet or the dry process of reduction. The wet process is carried out for example in the manner described above, by heating the material in oil. By the process the composition is preferably heated in a drum with agitation to about 240–250° C.

In place of reacting on the raw materials in the form of their solutions the nickel sulphate and calcium formate in the dry state may be mixed and preferably ground together and heated to bring about reduction. Preferably the dry mixture of nickel sulphate and calcium formate is slightly moistened to bring about reaction and this mass dried and heated to the decomposing temperature. In this way the use of dilute solutions and the evaporation of considerable quantities of water is avoided.

The exact procedure involved in making up the catalyzer under the present invention is not limited to the illustrative details given above. For example, sodium or potassium bicarbonate may be used in place of the corresponding normal carbonate. Good results may be obtained by the use of basic carbonate of nickel in place of the normal carbonate. For example a mixture of equal parts of caustic soda and sodium carbonate may be used as a precipitating agent for the requisite or equivalent amount of nickel sulphate which ensures the production of basic carbonate of the proper qualities. In another case nickel sulphate may be precipitated by sodium carbonate, potassium phosphate and the like, employing dilute or concentrated solutions either cold or hot in which to carry out the precipitation, the temperature of the solution tending to modify the character of the precipitate to a greater or less degree. The solution is put through a filter press and the cakes of nickel carbonate with adhering sodium sulphate, etc., may be placed directly in oil and heated with or without the addition of hydrogen gas or other reducing agent to produce the catalytic material. Or the press-cakes may be broken up and allowed to dry in the air or in an oven, preferably at a low temperature, about 50 to 70° C., in order to avoid great contraction of the particles of the precipitate. If the wet precipitate is heated in oil there is not the same opportunity for contraction that occurs when the precipitate is allowed to dry before being introduced in the oil. Furthermore the evolution of steam during the period the precipitate is being heated up with the oil tends to heat the particles in a distended condition which avails to produce a finely-divided porous spongy catalytic body. As stated, the reduction may be effected by means of hydrogen or other reducing gases such as carbon monoxide may be employed or reducing vapors such as alcohol and the like may be used. In some cases it is sufficient merely to heat up the composition in the oil to a somewhat higher temperature than would be used for reduction, by means of hydrogen in order to secure a greater or less reduction of the nickel material either to the metallic state or to a sub-oxide condition etc. It may be added that it is not necessary to carry out the reduction with hydrogen to the state of producing metallic nickel when a catalyzer in the form of the sub-oxide is desired, as the latter may be readily produced according to the conditions of operation by varying the the temperature. The temperature at which metallic nickel is formed having been first ascertained under the stated conditions the temperature may be kept below that point with a fresh quantity of the material in order to yield the sub-oxide or catalytic oxide which may be used for whatever catalytic operation is desired. other than hardening of oils or in oil-hardening itself.

There are certain advantages resulting from the reduction of the catalytic material in hardened oil which do not appear when using unsaturated oil. Many of the latter oils fume badly when strongly heated and deposit carbon or substances due to the decomposition of the oil which may act unfavorably on the catalyzer. These unsaturated oils such as fish oil, cottonseed oil and the like when highly heated polymerize, producing thick products which are not so readily filtered, whereas the hydrogenated oil is not affected in this way but is a non-polymerizing material, especially the fully hardened oil such as cotton or corn oil of melting point of 60° or higher. Petroleum oils and waxes may contain sulphur and in any case they crack when strongly heated, giving off gases oftentimes with the liberation of hydrogen sulphide which may be objectionable. The invention therefore embraces the use of a non-polymerizing fatty oil such as substantially completely hydrogenated fatty oils or high melting point stearine produced in other ways.

Another form of the invention embraces the production of catalyzers, which also may contain sulphates, and this is illustrated by the following procedure: Nickel hydrate (containing some sulfate if desired) was placed in paraffin wax and heated to the boiling point of the wax. The heating was carried out in a deep vessel closely covered so that air had practically no access as the vapors of the boiling wax filled the space above the liquid. In the first part of the operation water was evolved with some foaming and later the wax was brought to boiling gently. In the course of 20 minutes the wax became black in color and shortly afterwards on examining the material it was found to be filled with fine particles of magnetic nickel. No hydrogen or other reducing gas was introduced during the operation, the reduction taking place spontaneously in the presence of the boiling paraffin. In case the temperature of the boiling wax is too high to permit of the presence of sulphates or phosphates these may be washed out of the nickel hydrate, carbonate or other form of inorganic or organic nickel compound employed, or low-boiling waxes may be used in place of the hard wax which was employed in the experiment referred to.

A convenient method of preparing a mixture of sodium sulphate and nickel carbonate is as follows: 13 parts by weight of nickel sulphate ($6H_2O$) and 8.4 parts sodium bicarbonate were ground together and 6 parts of water were added. This formed a thin paste which gave off carbon dioxide gas in large quantities and became expanded to a porous pasty material which on further standing solidified to a porous mass. This was placed in oil and heated to expel the water when it was ready for reduction by treating with hydrogen at a reducing temperature.

Catalyzers comprising nickel and also containing precipitated barium sulfate, and sulfates broadly, and the preparation thereof, as described herein, are claimed in my co-pending application 276,869, above referred to.

What I claim is:

1. The process of making a catalyzer which consists in mixing solutions containing equivalent proportions of nickel sulphate and a soluble formate capable of reacting therewith, in evaporating to dryness and in heating the dried product to about 240° C.

2. The process of making a catalyzer adapted for the hardening of oils which comprises reacting on nickel sulphate with a soluble formate and reducing the nickel compound contained in the product without removal of the sulphate compound therefrom.

3. The process of making a catalyzer containing sulphates adapted for the hydrogenation of oils which comprises reacting on a soluble inorganic salt of nickel with a salt of formic acid capable of reacting with such salt of nickel, in the presence of sulphates, and in decomposing the organic salt formed by heating to a decomposing temperature.

4. A catalyzer material comprising nickel and a soluble sulphate, such product being free from sulfids in such quantities as could injure the said catalyst, and free from bodies capable of exerting a poisoning action on the said catalyzer when used in the hydrogenation of oil.

5. A catalyzer material containing a metal having an atomic weight between 58.7 and 63.3, and a soluble sulphate, such product being free from substantial quantities of sulfids.

6. A catalyzer material containing a metal having an atomic weight between 58.7 and 63.6, and a soluble sulphate, such product being free from deleterious quantities of sulfids and free from bodies capable of exerting a poisoning action on said catalyzer when used in hydrogenation reactions.

7. A catalyzer material containing a metal having an atomic weight between 58.7 and 63.6, and a soluble salt of an acid containing a metalloid element which, in the free state and in the state of its binary metal-containing compounds, if present in substantial quantities, would act as catalyzer poison such salt itself being non-poisonous to catalyzer in hydrogenation reactions, such catalyzer being free from deleterious amounts of binary compounds of such metalloid element.

8. A catalyzer mass containing a metal having an atomic weight between 58.7 and 63.6, and containing a soluble salt of an oxygen-containing acid of a metalloid element having an atomic weight of about 31 to 32, such product being free from substances capable in inhibiting hydrogenation.

9. A process of making a catalyzer containing a sulfate which comprises reacting upon nickel sulfate in the presence of water with a soluble salt of an acid of which the nickel salt is readily reducible to the metallic state, drying the precipitate while containing some at least of the sulfate of the metal contained in said soluble salt, and reducing the nickel compound contained in the dried product, while avoiding the reduction of any substantial amount of the said metal sulfate.

10. A process of making a catalyzer containing a sulfate which comprises reaction upon nickel sulfate in the presence of water with a soluble salt of an acid of which the nickel salt is readily reducible to the metallic state, segregating the precipitate while containing some at least of the sulfate of the metal contained in said soluble salt, and reducing the nickel compound contained in said segregated product, while avoiding the reduction of any substantial amount of the said metal sulfate.

11. A process of making a catalyzer containing a sulfate which comprises reacting on nickel sulfate, in the presence of water, with a compound containing a metal combined with a radical and the sulfate of which metal is somewhat soluble, the nickel compound of said radical being readily reducible to give metallic nickel, segregating the resulting nickel compound while still containing at least some of the sulfate produced in the reaction, and reducing the nickel compound to the metallic state.

12. A process which comprises reacting with a nickel salt on another compound free from catalyzer poison, and converting the resulting nickel compound into the metallic state, in the presence of some of the other reaction products which are water-soluble, while avoiding the introduction thereinto of catalyzer poisons.

13. A mixture for use in effecting catalysis in the hydrogenation of oil, comprising a readily reducible nickel compound and an inorganic salt capable of facilitating separation of the catalyst from the hydrogenated oil, such materials being incorporated in an oil vehicle.

14. The process for the manufacture of a catalyzer mixture for treating oil, comprising the steps of producing a mixture of a readily reducible nickel compound and an inorganic salt capable of facilitating separation of the catalyst from the oil treated, and reducing the nickel compound in said mixture.

15. The process for the manufacture of a catalyzer mixture for treating oil, comprising effecting a metathetic reaction between a soluble nickel salt and a soluble salt capable of reaction therewith in the presence of water, removing the water from the resultant mixture, and decomposing the nickel compound in the mixture.

16. The process for the manufacture of a catalyzer mixture for treating oil, comprising the steps of producing a mixture of a readily reducible nickel compound and an inorganic salt capable of facilitating separation of the catalyst from the treated oil, and setting free the nickel in said mixture in the presence of oil.

17. In the process of producing a catalyzer for treating oil, mixing solutions of a soluble nickel salt and a soluble substance capable of reacting therewith, removing the water from the resulting product, admixing the dry residue with oil, and heating the resulting mixture under reducing conditions to liberate metallic nickel suitable for use as a catalyst in hydrogenation.

CARLETON ELLIS.